United States Patent
Gebhardt et al.

(10) Patent No.: US 12,402,632 B2
(45) Date of Patent: Sep. 2, 2025

(54) DOUGH PROCESSING MACHINE FOR TREATING PRODUCTS

(71) Applicant: FRITSCH BAKERY TECHNOLOGIES GMBH & CO. KG, Markt Einersheim (DE)

(72) Inventors: Samuel Gebhardt, Kitzingen (DE); Johannes Lang, Theilheim (DE)

(73) Assignee: FRITSCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 995 days.

(21) Appl. No.: 17/500,435

(22) Filed: Oct. 13, 2021

(65) Prior Publication Data

US 2022/0110333 A1 Apr. 14, 2022

(30) Foreign Application Priority Data

Oct. 13, 2020 (DE) .......................... 102020126779.7

(51) Int. Cl.
*A21B 1/48* (2006.01)
*A21B 1/40* (2006.01)
(Continued)

(52) U.S. Cl.
CPC .................. *A21B 1/48* (2013.01); *A21B 1/40* (2013.01); *A21C 9/08* (2013.01); *A21C 14/00* (2013.01); *G05B 13/024* (2013.01); *Y02P 90/02* (2015.11)

(58) Field of Classification Search
CPC .... A21B 1/48; A21B 1/40; A21C 9/08; A21C 14/00; G05B 13/024; Y02P 90/02
See application file for complete search history.

(56) References Cited

U.S. PATENT DOCUMENTS 4,883,417 A 11/1989 Morikawa et al.
9,675,083 B2 * 6/2017 Bernhardt .............. A21C 9/085
(Continued)

FOREIGN PATENT DOCUMENTS

AT 72 381 T 2/1992
DE 10 2004 038 088 A1 3/2006
(Continued)

OTHER PUBLICATIONS

Machine English translation of DE-102009061006-A1 (Year: 2009).*
(Continued)

*Primary Examiner* — Steven W Crabb
*Assistant Examiner* — Fahmida Ferdousi
(74) *Attorney, Agent, or Firm* — BROOKS KUSHMAN P.C.

(57) ABSTRACT

A dough processing machine for treating products in the food industry may comprise at least two workstations arranged consecutively along a transport path of products, where operation of the workstation, in a direction of transport being the first one, depends on a first performance parameter $L_1$ and operation of the workstation, in the direction of transport being the second one, depends on a second performance parameter $L_2$. The dough processing machine may further comprise a control unit which is connected to the workstations for adjusting the performance parameters, and an input device connected to the control unit via which a factor $$F = \frac{L_1}{L_2}$$

(Continued)

can be adjusted. The control unit is configured to adjust the performance parameters of the first workstation and the second workstation as a function of F and to leave all other factors $$F_{nm} = \frac{L_n}{L_m}$$

unchanged, where $L_n$, $L_m$ are performance parameters of different workstations n, m.

20 Claims, 3 Drawing Sheets

(51) Int. Cl.
*A21C 9/08* (2006.01)
*A21C 14/00* (2006.01)
*G05B 13/02* (2006.01)

(56) References Cited

U.S. PATENT DOCUMENTS

| | | | | |
|---|---|---|---|---|
| 2020/0027173 A1* | 1/2020 | Sun | ................ | G06Q 10/06393 |
| 2022/0330560 A1* | 10/2022 | Zecher | ............... | A22C 17/0093 |
| 2023/0221705 A1* | 7/2023 | Lang | ................ | G05B 19/41865 |
| | | | | 700/100 |
| 2024/0300684 A1* | 9/2024 | Gropper | ................. | B65B 35/44 |

FOREIGN PATENT DOCUMENTS

| | | | | |
|---|---|---|---|---|
| DE | 102009017638 A1 | * | 10/2010 | ............... G01D 7/02 |
| DE | 102009061006 A1 | * | 11/2010 | ............... G01D 7/02 |
| DE | 10 2014 005 998 B3 | | 5/2015 | |
| EP | 0 938 844 B1 | | 6/2001 | |

OTHER PUBLICATIONS

Machine English translation of DE-102009017638-A1 (Year: 2009).*
German Search Report Dated May 28, 2021, Application No. 10 2020 126 779.7, Applicant Fritsch Bakery Technologies Gmbh & Co. KG, 5 Pages.
European Search Report Dated Mar. 23, 2022 (with English Machine Translation), Application No. / Patent No. 21200027.7-1216 / 3985459, Applicant Fritsch Bakery Technologies Gmbh & Co. KG, 15 Pages.

* cited by examiner

DOUGH PROCESSING MACHINE FOR TREATING PRODUCTS

CROSS-REFERENCE TO RELATED APPLICATIONS

This application claims foreign priority benefits under 35 U.S.C. § 119(a)-(d) to German patent application number DE 102020126779.7, filed Oct. 13, 2020, which is incorporated by reference in its entirety.

TECHNICAL FIELD

The present disclosure relates to a dough processing machine for treating products in the food industry and a method for controlling the operation of a dough processing machine for treating products in the food industry.

BACKGROUND

Dough processing machines in the food industry are well known. They typically comprise a plurality of different workstations, such as a transport device for dough and a shaping device which shapes dough blanks for dough products from a strip of dough that is transported in the transport device.

The operation of the various workstations arranged consecutively is typically coordinated in a manner that is matched to one another. Firstly, this serves to treat the products with uniform quality, if possible, without operator intervention, and, secondly, this ensures smooth operation of the entire dough processing machine, even over long periods of time.

Changes to the process conditions could previously be determined by setting target values for performance parameters of individual workstations.

However, this is complex, since the performance parameters of different workstations can depend on one another, but are not necessarily of the same magnitude. On the one hand, this makes adjusting the target values cumbersome for the operator and, on the other hand, is prone to errors. These problems become more relevant, the more complex the relationships between the individual workstations are and the more workstations are provided.

Furthermore, DE 10 2009 017 638 shows e.g., the centralized adjustment of a performance or product parameter. While all other parameters of the working machine can be determined based thereupon, this, however, only allows the process conditions to be changed as a whole and is therefore less flexible. In addition, the relative processes between the workstations are not influenced in this way.

SUMMARY

Proceeding from known prior art, a technical object to be satisfied consists in specifying a dough processing machine for treating products in the food industry and a method for controlling such a dough processing machine, with which process conditions can be adjusted as flexibly as possible by an operator when operating the dough processing machine, while the susceptibility to errors when changing process conditions is reduced at the same time.

This object is satisfied by a dough processing machine of the disclosure for treating products in the food industry and a method for controlling the operation of a dough processing machine for treating products in the food industry.

A dough processing machine according to the disclosure for treating products in the food industry comprises at least two workstations arranged consecutively along a transport path of products, where the operation of the workstation, in the direction of transport being the first one, depends on a first performance parameter $L_1$, and the operation of the workstation, in the direction of transport being the second one, depends on a second performance parameter $L_2$, a control unit which is connected to the workstations for adjusting the performance parameters, and an input device connected to the control unit via which a factor $$F = \frac{L_1}{L_2}$$

can be adjusted, where me control unit is configured to adjust the performance parameters of the first and the second workstation as a function of F and to leave all other factors $$F_{nm} = \frac{L_n}{L_m}$$

unchanged, where $L_n$, $L_m$ are performance parameters of different workstations n, m.

Performance parameters $L_1$ and $L_2$ are advantageously but not necessarily physical variables, such as a transport speed. In particular, the performance parameters can relate to the same variables but different magnitudes, such as a first transport speed and a second transport speed that differ from one another.

By specifying factor F once, the operator can easily intervene in the operation of the dough processing machine at a suitable point, for example, to change the elongation or stretching or compression of dough at a dough transfer point. By further adjusting the performance parameters, while maintaining the other factors, it is ensured at the same time that the relationships of neighboring workstations remain unchanged and that the operation of the dough processing machine can be continued without errors.

While factors F and $F_{nm}$, respectively, are presently given by way of the quotients of second performance parameters, this should also be understood to mean that the respective factors are possibly formed from the respective quotients of the performance parameters multiplied by a multiplier, for example a value γ. In the most general form, this can be the factors $F_{nm} = \gamma L_n / L_m$. This can be the case in particular where, while the dependence of the factor on the various performance parameters $L_n$ and $L_m$ is given, the performance parameters, however, are not of the same magnitudes, for example, of the same physical units. For example, a first performance parameter can be a transport speed and a second performance parameter can indicate a quantity of product that is output, for example, flour. While the operation of the workstation can then depend on the coefficient between the transport speed in one workstation and the quantity of flour output in the other workstation, an additional dependency on the multiplier γ can arise, which, for example, can describe a conversion ratio between performance parameters with various units.

For the further discussion, γ=1 is set and is therefore typically not mentioned separately. It is understood, however, that the following embodiments can also be implemented using the multiplier γ, which, even if not explicitly mentioned, is always to be regarded as being comprised.

Controlling as to how a change in $F_{ij}$ adjusted by the operator on the input device is then actually implemented in the workstations by adapting values $L_i$ and $L_j$, can be, for example, part of programming or internal specifications of the control unit. If, for example, the first workstation is less easy to change over to changes in the performance parameter than the second workstation, then a change in factor $F_{12}$ can preferably take place by changing performance parameter $L_2$ of the second workstation. The same applies, of course, in the opposite case It can be ensured with this embodiment that the work processes that are dependent on the adjustment of the factor are properly adapted.

While the first and the second workstations are mentioned here and hereafter, it is understood that they are not necessarily the first and the second workstation in the direction of transport. The first and the second workstation can be located anywhere along the direction of transport. It is only intended that this first and second workstation are arranged consecutively in the direction of transport.

More generally, two adjacent workstations i and j, with j=i+1 and i<N, j≤N, N∈ℕ can be meant, where N indicates the total number of workstations of the dough processing machine.

It is provided in one embodiment that the control unit is configured to adjust at least one performance parameter of a workstation that is arranged in the direction of transport upstream of the first workstation as a function of F and $L_1$ once F has been adjusted; and/or where the control unit is configured to adjust at least one performance parameter of a workstation that is arranged in the direction of transport downstream of the second workstation as a function of F and $L_2$ once F has been adjusted.

Furthermore, it can be provided that the dough processing machine comprises a workstation, the performance parameter L of which is independent of the performance parameters of the other workstations, where the control unit is configured to keep the performance parameter L constant once F has been adjusted.

Such a workstation can be, for example, an oven in which the temperature must always remain constant regardless of other performance parameters of other workstations, for example, to prevent dough from being baked at too high or too low a temperature. The transport speed of the dough products through this oven, which can be another possible performance parameter in the context of this embodiment, typically has to remain constant, since the dwell time of the dough product in the oven is typically likewise independent of a change in the transport speed of the dough products in workstations upstream of the oven or downstream of the oven. Such specific requirements for performance parameters of certain workstations are taken into account with this embodiment.

In one embodiment, a workstation is configured as a default station and the input device is configured to adjust a performance parameter $L_{\_default}$ and the control unit is configured to adjust all performance parameters of all workstations as a function of $L_{\_default}$.

The default station can also be referred to as a master station and serve as a default for all other workstations or at least a group of workstations. If, for example, the transport speed as a performance parameter $L_{default}$ of the default station is increased, then this can be used to increase all performance parameters accordingly. Performance parameters $\overline{L}$, which are always constant regardless of the other performance parameters of the workstations, can be excluded from this. This embodiment allows for easy adjustment of all performance parameters of all workstations.

In a further development of this embodiment, the performance parameters of all workstations can be adjusted by the control unit as a function of factors $$F_{nm} = \frac{L_n}{L_m}$$

and of $L_{default}$ in such a way that all $F_{nm}$ remain constant.

This can be achieved, for example, by adjusting each of the performance parameters $L_n$ and $L_m$ as a function of the relationship between the new performance parameter $L_{default}$ and the old performance parameter $L_{default, \ old}$. If each performance parameter $L_n$, $L_m$ is multiplied by this value, then factors $F_{nm}$ do not change as a result, so that the relative relationships between neighboring workstations can be maintained despite changed performance parameters, which allows for the workstations of the dough processing machine to be adjusted in a simple manner.

In one embodiment, the performance parameters are transport speeds. Transport speeds as a possible performance parameter are often changed during operation, for which reason their simple adjustment can improve the operation of the dough processing machine.

Furthermore, at least one of the workstations can be or comprise a transport device for transporting products and/or at least one of the workstations can be or comprise a treatment station for treating products.

The term treatment station is understood to mean any station that not only transports the products but possibly acts upon the products in addition to the transportation or without transportation of the products. In the case of dough products in particular, this comprises, for example, mixing dough, baking dough, shaping dough, applying further elements to a portion of dough, dividing the portions of dough, wrapping a portion of dough or the like. The above exemplary embodiments are not to be understood as being restrictive and all other types of treatment stations are presently conceivable. In one embodiment, the control unit is configured to verify a setting of a factor based on a permissible performance parameter range and to carry out or refuse the adjustment of the factor in dependence of an outcome of the verification.

For example, a permissible performance parameter range, for example, a value range, can be stored or be accessible in the control unit for all or each performance parameter separately or only for some of the performance parameters. If the adjustment of the factor by the operator then causes the permitted performance parameter range to be exceeded, then the control unit can be configured to reject or refuse the changes in the factor. It can be provided that the adjustment of the factor is not verified solely on the basis of the performance parameters or the performance parameter ranges permissible for this factor, but rather any change in a performance parameter that will bring about this change in the factor, is first verified with regard to compatibility with a performance parameter range associated with the performance parameter. It can be provided that the adjustment of the factor is only accepted by the control unit if the control unit determines that the change in the factor for adjusting all the performance parameters does not lead out of the respective performance parameter range.

A method according to the disclosure for controlling the operation of a dough processing machine for treating products in the food industry, the dough processing machine comprising at least two workstations arranged consecutively along a transport path of products, where the operation of the workstation, in the direction of transport being the first one, depends on a first performance parameter $L_1$, and the operation of the workstation, in the direction of transport being the second one, depends on a second performance parameter $L_2$, a control unit which is connected to the workstations for adjusting the performance parameters, and an input device connected to the control unit, comprises the adjustment of factor $$F = \frac{L_1}{L_2}$$

by way of the input device and the adjustment of the performance parameters of the first and the second workstation as a function of the adjustment of F by the control unit, where the control unit leaves all other factors $$F_{nm} = \frac{L_n}{L_m}$$

unchanged, where $L_n$, $L_m$ are performance parameters of different workstations n, m.

This method enables the operator to control and change the performance parameters of a dough processing machine in a simplified manner.

It can be provided that the control unit is configured to adjust at least one performance parameter of a workstation, that is arranged in the direction of transport upstream of the first workstation, as a function of F and $L_1$ once F has been adjusted; and/or where the control unit is configured to adjust at least one performance parameter of a workstation, that is arranged in the direction of transport downstream of the second workstation, as a function of F and $L^2$ once F has been adjusted. Depending on the change in F and possibly depending on additional information, either the process sequence can be influenced upstream of the pair of workstations for which the factor is adjusted, or downstream of this pair of workstations. This can be advantageous depending on the processes to be carried out.

Furthermore, the dough processing machine can comprise a workstation, the performance parameter $L^-$ of which is independent of the performance parameters of the other workstations, where the control unit is configured to keep performance parameter $L^-$ constant once F has been adjusted. This allows processes whose performance parameters have to remain constant (such as the dwell time or the temperature within an oven) to be excluded from the adjustment of the factors.

It can also be provided that a workstation is further configured as a default station and the input device receives an input for the adjustment of a performance parameter $L_{\_default}$ and the control unit adjusts all performance parameters of all workstations as a function of $L_{\_default}$. By using such a default station, which can also be referred to as a master station, all performance parameters can be increased or decreased, while only the adjustment of the performance parameter of a single workstation, namely the default station, is necessary.

In a further development of this embodiment, the performance parameters of all workstations are adjusted by the control unit as a function of factors $$F_{nm} = \frac{L_n}{L_m}$$

and or $L_{\_default}$ in such a way that all factors $F_{nm}$ remain constant. This ensures that the relative relationships between neighboring workstations are not unintentionally influenced by the adjustment of the default stations.

It can furthermore be provided that the performance parameters are transport speeds. The adjustment of the respective factors is particularly advantageous for transport speeds It is provided in a further embodiment that the control unit verifies an adjustment of a factor based on a permissible performance parameter range and carries out or refuses the adjustment of the factor in dependence of an outcome of the verification.

This verification may not only be carried out on or for the performance parameters directly involved in the adjustment of the factor, such as performance parameters $L_1$ and $L_2$, but can also be carried out on all other performance parameters that can be influenced by the adjustment of this factor, and the adjustment of the factor is carried out only if this verification shows that the adjustment of the performance parameters leads to an adjustment for each performance parameter within the permissible performance parameter range.

DETAILED DESCRIPTION

Figure 1:
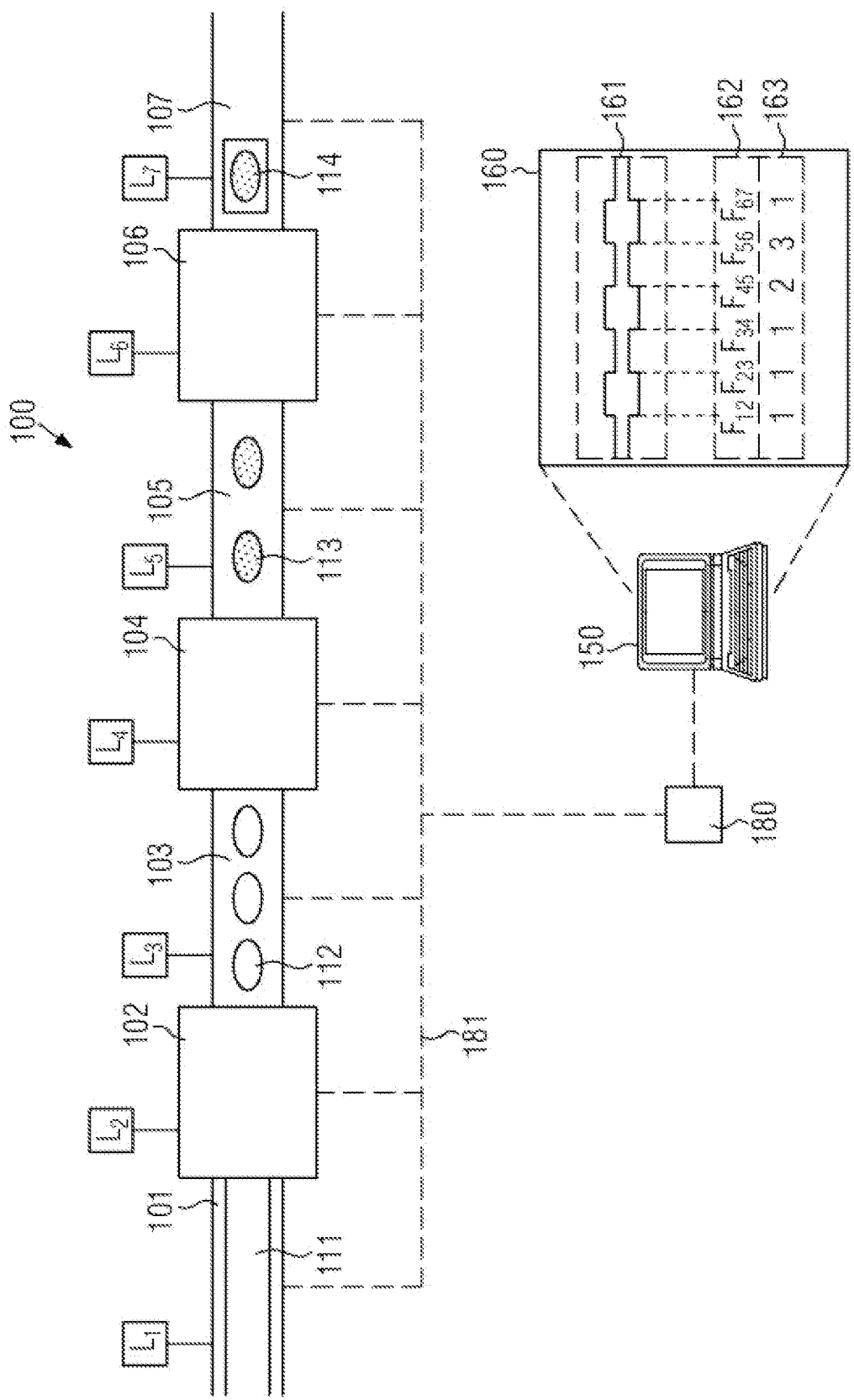
FIG. 1 shows a schematic view of a dough processing machine according to an embodiment.

FIG. 1 shows an embodiment of a dough processing machine 100 for treating products. This dough processing machine can be a dough processing machine in the food industry and typically comprises a plurality of workstations 101 to 107. The term workstation is basically to be understood to mean any device that performs an action on or in relation to products, in particular dough and/or its ingredients. The general term workstation therefore not only comprises those workstations that perform a (physical) change to products, but the term workstation is also to be comprehensively understood to mean, for example, transport devices and/or inspection devices for the products. Workstations that perform (physical) changes to the products can also be referred to as "treatment stations".

In this sense, FIG. 1 shows workstations 101, 103, 105 and 107 which are configured as transport devices for products 111, 112, 113 and 114. The transport devices can be configured, for example, in the form of conveyor belts or transport chains or holders for holding products and transporting these products along a transport path. The disclosure is not restricted in this regard.

Furthermore, workstations 102, 104 and 106 are shown in FIG. 1. In the embodiment shown, these workstations are configured as workstations that carry out a (physical) actual treatment of products.

In the exemplary embodiment in FIG. 1, for example, a strip of dough 111 is shown which is first supplied to workstation 102 by way of transport device 101. This strip of dough 111 can preferably be an "endless" strip of dough which can be supplied to workstation 102 without interruption. In this workstation, individual pieces of dough or portions of dough can be formed from the strip of dough 111 so that a series of portions of dough or pieces of dough 112 can then be transported using transport device 103 to downstream workstation 104. In this workstation, portions of dough 112 can be provided with a topping, for example, so that portions of dough 113 provided with a topping leave workstation 104 and are supplied via transport device 105 to further workstation 106. The workstation 106 can be, for example, a packaging machine that packages the individual portions of dough provided with the topping so that packaged end products 114 can be given out and, for example, be transported onward via transport device 107. Instead of a packaging machine, however, for example, an oven can presently also be provided which can bake the portions of dough with the topping. Alternatively or additionally, a freezer that can freeze the products can also be provided. Workstation 106 is not restricted in this regard.

This process is to be understood to be only by way of example and can also be implemented differently. In principle, all workstations known in the food industry and in particular all known transport devices and/or treatment stations can presently be implemented.

In the embodiment shown in FIG. 1, each of workstations 101 to 107 is associated with at least one performance parameter $L_1$ to $L_7$. The performance parameters are those variables on which the operation of the respective workstation depends. The performance parameters can be, for example, physical variables. Using the example of transport devices 101, 103, 105 and 107, the associated performance parameters can be, for example, a transport speed. Analogously, a performance parameter can also be provided for workstations 102, 104 and 106 and specify the transportation of the individual products through these workstations, for example, likewise a transport speed.

However, the performance parameters are not restricted to a transport speed. Other performance parameters, for example, a throughput (number of products per unit of time, for example, per hour) or a quantity of product to be output per unit of time or the like, can also serve as performance parameters.

In principle, it can be provided that performance parameters $L_1$ to $L_7$ can be adjusted variably over a discrete or (continuous) performance parameter range so that they can be changed as required during the operation of dough processing machine 100. However, it can also be provided that one or more performance parameters cannot be changed. This can be the case, for example, for a temperature and/or the dwell time of products in an oven. Such predetermined and constant performance parameters $\overline{L}$, which are independent of the other performance parameters, remain constant in the event of any changes in other performance parameters.

The dough processing machine further comprises a control unit 180 which can be in communication with workstations 101 to 107 for the purpose of data exchange via corresponding data connections 181. These data connections 181 can be implemented, for example, in the form of cables (or general physical connections) or wirelessly, for example, via wireless LAN. Control unit 180 can be configured as a control unit 180 known in the field of dough processing machines, for example, as a computer or a server or the like. It can include suitable programming to monitor and/or control the operation of the individual workstations.

Data connections 181 can preferably be configured to be bidirectional so that feedback from the workstations to the control unit and a transmission of data from control unit 180 to the individual workstations is possible.

An input device 150 is furthermore shown in FIG. 1. It is presently shown as a laptop, but can also be implemented in other ways. In particular, in one embodiment, the input device can be configured as a controls terminal of the system or it can comprise such a terminal. In principle, the input device only needs to be configured to be able to receive user commands or user inputs and to transmit them to the control unit. The input device can also include a display 160. Information about the operation of the dough processing machine can be shown on this display.

As one skilled in the art would understand, the control unit 180 and/or the input device 150 may include suitable hardware and software, such as one or more processors (e.g., one or more microprocessors, microcontrollers and/or programmable digital signal processors) in communication with, or configured to communicate with, one or more storage devices or media including computer readable program instructions that are executable by the one or more processors so that the control unit and/or the input device may perform particular algorithms represented by the functions and/or operations described herein. The control unit 180 and/or the input device 150 may also, or instead, include one or more application specific integrated circuits, programmable gate arrays or programmable array logic, programmable logic devices, or digital signal processors.

It is provided in the embodiment presently described in particular that neighboring workstations, such as workstation 101 and workstation 102, are coupled to one another via a factor $F_{12}$. This means that performance parameters $L_1$ and $L_2$ are linked to one another in the ratio of $$\frac{L_1}{L_2} = F_{12},$$

so that the operation of workstation 101 is related to the operation of workstation 102 by way of factor $F_{12}$. The same applies to the other pairs of workstations, for example, i.e., workstation 102 and workstation 103, which are related to one another by way of a corresponding factor (presently $F_{23}$).

For this purpose, a schematic representation 161 of the dough processing machine with the associated workstations can be shown on display 160 to illustrate the operation of the dough processing machine to the user. A representation of corresponding factors $F_{ij}$ (where i and j each represent the number of the workstation) can also be displayed in region 162. At the same time, for example, an optical representation such as a bracket can be shown to illustrate which of the factors relates to the interaction with which workstations, so that the operator is able to associate e.g., factor $F_{12}$ to workstations 101 and 102. The workstations are numbered consecutively there. However, other names are also conceivable. The disclosure is also not restricted in this regard.

Beyond that, it can be provided that the respective value of the factors is shown in a further region 163. The numerical values shown there for the factors ($F_{12}=1$, $F_{23}=1$, $F_{34}=1$, $F_{45}=2$, $F_{56}=3$, $F_{67}=1$) are only by way of example and for illustration purposes only and are therefore not restrictive. This gives the operator a simplified overview of the relationships between neighboring workstations.

It is now provided according to the disclosure that an input by the operator for the adjustment of at least one of the factors can be done by way of input device 160. For example, factor $F_{34}$ can be adjusted, where factor $F_{34}$ is either increased or decreased. For example, factor $F_{34}$ can be adjusted by an operator from the current value of 1 to the value of 2 by way of a corresponding input.

Since $F_{34}=L_3/L_4$, this new determination of factor $F_{34}$ requires a change in the performance parameters. The increase of the factor can, for example, be translated to the operation of the dough processing machine in that performance parameter $L_3$ is increased by a factor of 2 or performance parameter $L_4$ is decreased by a factor of 2. It can be provided there that a user entry causing a factor to be increased always increases the performance parameter in the numerator of the quotient by the corresponding factor. If the factor is reduced, it can be provided that the performance parameter in the denominator is increased by the corresponding factor. Other combinations are also conceivable there.

It is then provided after such an input that the control unit adjusts the other performance parameters, if necessary, in such a way that the other factors $F_{nm}$ remain unchanged. This is described in more detail in FIG. 2.

Figure 2:
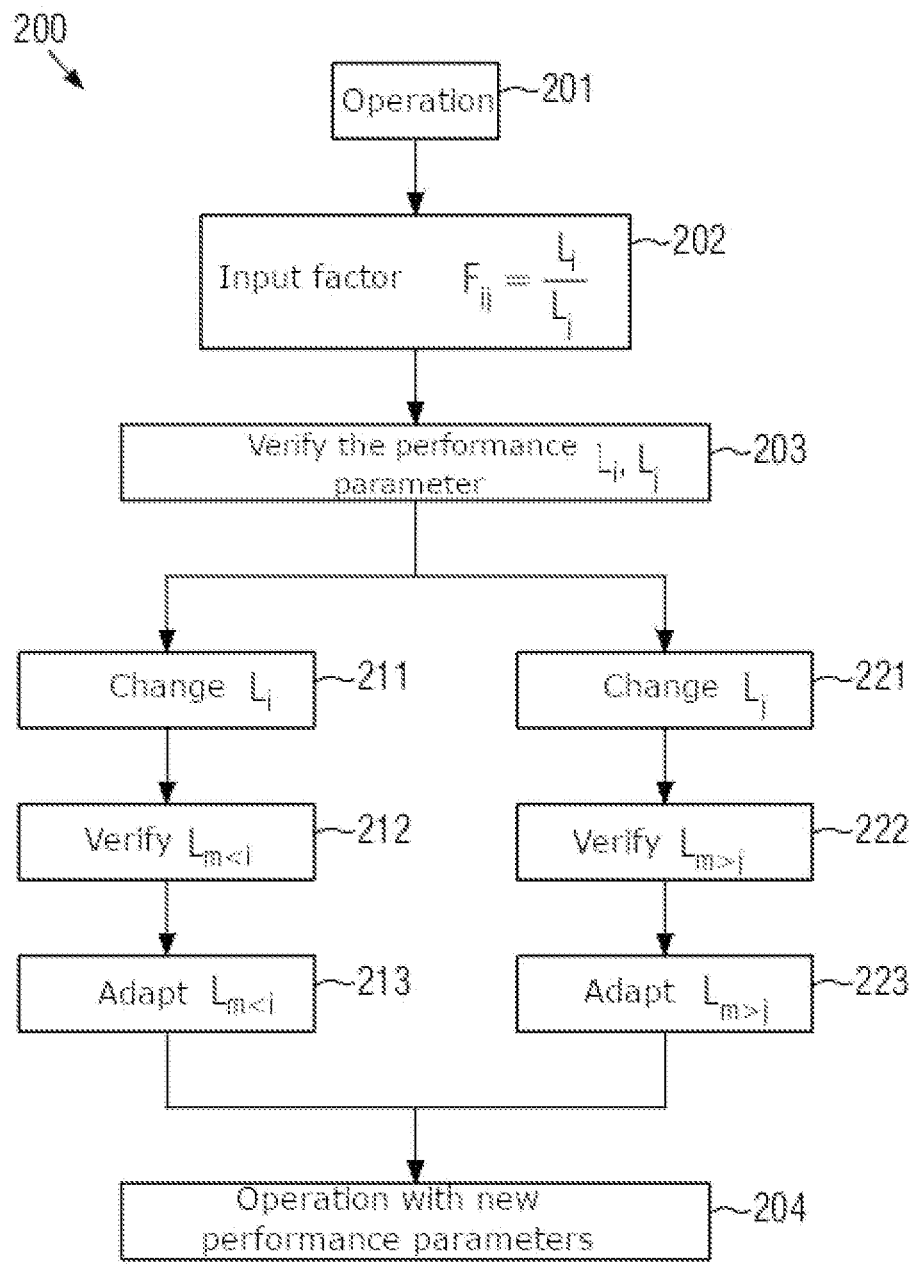
FIG. 2 shows a flow diagram of a method according to an embodiment.

FIG. 2 shows a flow diagram of a method for the adjustment of a factor and the subsequent change-over of the operation of the dough processing machine according to one embodiment.

As described with reference to FIG. 1, an operator can in principle enter a changed factor $F_{ij}$ via the input device, which is then used by the control unit for adapting the other performance parameters where necessary. FIG. 2 now describes an embodiment of how this can be done.

Method 200 in FIG. 2 first begins with operation 201 of the dough processing machine with the given performance parameters and factors. They can have any, optionally preset values.

At any point in time, an operator performs an input into input device 150 in step 202 with which a new factor $F_{ij}=L_i/L_j$ is determined. The factor can be, for example, increased or decreased. In principle, an input can be performed by an operator in such a way that either a multiplier is specified by which original factor $F_{ij}$ is to be multiplied, or that a new value is input for factor Fij. In a preferred embodiment, both the multiplier as well as the new factor can assume any real numbers greater than zero. However, embodiments are also conceivable in which the multiplier and/or the factor (and/or one or both performance parameters) can assume negative values.

It can now be verified in a subsequent optional step, step 203, whether the change in factor $F_{ij}$ results in at least one of performance parameters $L_i$ or $L_j$ of the respective workstation having to be changed in such a way that its value is outside a performance parameter range that is permissible for the respective workstation.

For example, a change in factor $F_{ij}$ can be performed which doubles this factor. This means that either performance parameter $L_i$ must be doubled or performance parameter $L_j$ must be halved or a change in the performance parameters between these value ranges is obtained. If performance parameter $L_i$ is already set at the upper limit of a performance parameter range permissible for the respective workstation, then an increase of performance parameter $L_i$ for realizing the adjustment of new factor $F_{ij}$ is not permissible and can be excluded or rejected by the control unit. If the value of performance parameter $L_j$ in such a case is at the same time at the lower limit of the performance parameter range of the associated workstation, then a respective adjustment of performance parameter $L_j$ also fails, which means that it is not possible to implement newly entered factor $F_{ij}$. In such a case, the verification in step 203 can result in the operator's input for new factor $F_{ij}$ being rejected and the adjustment of the factor and the associated adjustment of the performance parameters not being carried out or being refused by control unit 180.

In an alternative case thereto, the situation can arise in which the adjustment of performance parameter $L_i$ is not possible (as just explained) but the adjustment of parameter $L_j$ is still possible within the performance parameter range that is permissible for this performance parameter in such a way that the input of factor $F_{ij}$ can be realized with the adjustment of performance parameter $L_j$. In such a case, the verification can then show that, although a further change or increase in performance parameter $L_i$ is not possible, performance parameter $L_j$ can nevertheless be adjusted, thereby then achieving newly adjusted factor $F_{ij}$. The inverse case is also conceivable.

It is presently to be mentioned that the respective performance parameter ranges for performance parameters $L_i$ and $L_j$ do not have to be identical. Since performance parameters $L_I$ and $L_j$ are performance parameters associated with different workstations, different performance parameter ranges can be specified. The performance parameter ranges or at least one of the performance parameter ranges also do not have to contain a continuous interval of numbers, but can also be restricted to certain sub-ranges. This does not change anything about the procedure for verifying the performance parameters with regard to their adjustments for realizing newly set factor $F_{ij}$.

Depending on the outcome of the verifications and/or depending on the pre-adjustment, in the next step, performance parameter $L_i$ can optionally be adjusted in step 211 or performance parameter $L_j$ can be adjusted in step 221 in such a way that newly set factor $F_{ij}$ for workstations i and j is realized.

In principle, the procedure with which new factor $F_u$ is transformed upon performance parameters $L_i$ and $L_j$ is arbitrary. However, it can prove to be advantageous when increasing factor $F_{ij}$ from its present value, to preferably increase performance parameter $L_I$ accordingly (except for a result that does not allow this during the verification in step 203). If, however, factor $F_{ij}$ is reduced, it can be preferred that a corresponding change in performance parameter $L_j$ is effected in step 221 for realizing the reduction in factor $F_{ij}$.

This has different consequences for the other performance parameters of the other workstations.

If, for example, performance parameter Li is adjusted as a function of factor $F_{ij}$ and performance parameter $L_j$ remains constant, it may be necessary for the correct operation of the entire dough processing machine that the corresponding performance factors are adapted with an index m<i so that respective factors $F_{nm}$ (for m, n<i) remain constant and their operation can be continued at least in the relative relationship to one another like before the adjustment of the factor.

This can comprise that, in a subsequent step once it has been determined that performance parameter $L_i$ is to be changed, performance parameters $L_{m<i}$ are verified in step 212 with regard to their adaptation.

In one embodiment, this can be done in that factor $$F_{i-1,i} = \frac{L_{i-1}}{L_i}$$

first remains constant and the necessary change in performance parameter $L_{i-1}$ is determined based on the already determined change in performance parameter $L_i$ and factor $F_{i-1}$, where $F_{i-1}$, i remains constant. If performance parameter $L_{i+1}$, is in a performance parameter range permissible for this performance parameter (see the description of step 203 in this regard), then the control unit can determine that an adaptation of this performance parameter $L_{i-1}$ is permissible. This can then be carried out again for next performance parameter $L_{i-2}$ based on associated factor $$F_{i-2,i-1} = \frac{L_{i-2}}{L_{i-1}}$$

until all or the performance parameters disposed in the direction of transport of the products upstream of workstation i have been verified. It can be provided in a particularly preferred embodiment that the adaptation of the performance parameters takes place only if the verification for all of these performance parameters $L_{m<i}$ shows that they are being changed within their respective permissible performance parameter range. This then takes place in step 213, whereupon the operation can be continued with the new performance parameters in step 204.

If, as an alternative thereto, a change in performance parameter $L_j$ is determined by the control unit, then performance parameters $L_{m>j}$ can be verified in step 222 in a manner analogous to step 212. In this case, it can then be verified based on the immediately subsequent workstation and associated performance parameter $L_{j+1}$ and based on factor $$\frac{L_j}{L_{j+1}} = F_{j,j+1}$$

whether performance parameter $L_{j+1}$ can be changed within the range of performance parameters permitted for this while Factor $F_{j,j+1}$ remains constant. This can then be carried out successively for other performance parameters $L_{m>j}$ and, analogously to step 213, an adaptation of all performance parameters $L_{m>j}$ can take place, only where the verification of all performance parameters $L_{m>j}$ shows that an adaptation of the performance parameters is possible in their permissible performance parameter range, whereupon the operation can be continued analogously in step 204 with the new performance parameters.

For the sake of simplicity of the description, all performance parameters $L_k$ In the embodiment described above were regarded as being changeable based on the adjustment of factor $F_{ij}$. As already described with reference to FIG. 1, however, there may be performance parameters $\overline{L}$ which must always remain constant during operation of the dough processing machine, such as the temperature in an oven or the length of time that products dwell in an oven and therefore also the transport speed of the products through the oven. These performance parameters can remain disregarded in the assessment in the method according to FIG. 2, since they are not changed anyway.

Such performance parameters that remain constant can lead to an adaptation of performance parameters, starting out from a change in a factor $F_{ij}$, only taking place up to the workstation for which the performance parameter must remain constant. All subsequent workstations or all of these preceding workstations can then possibly not be affected by the adjustment of factor $F_{ij}$. However, this is not mandatory.

While the description of FIG. 2 describes the adjustment of the performance parameters on the basis of a change in a factor $F_{ij}$ while maintaining all the factors, an additional input option can be provided for the operator and can change the setting of the operation of the dough processing machine.

Figure 3:
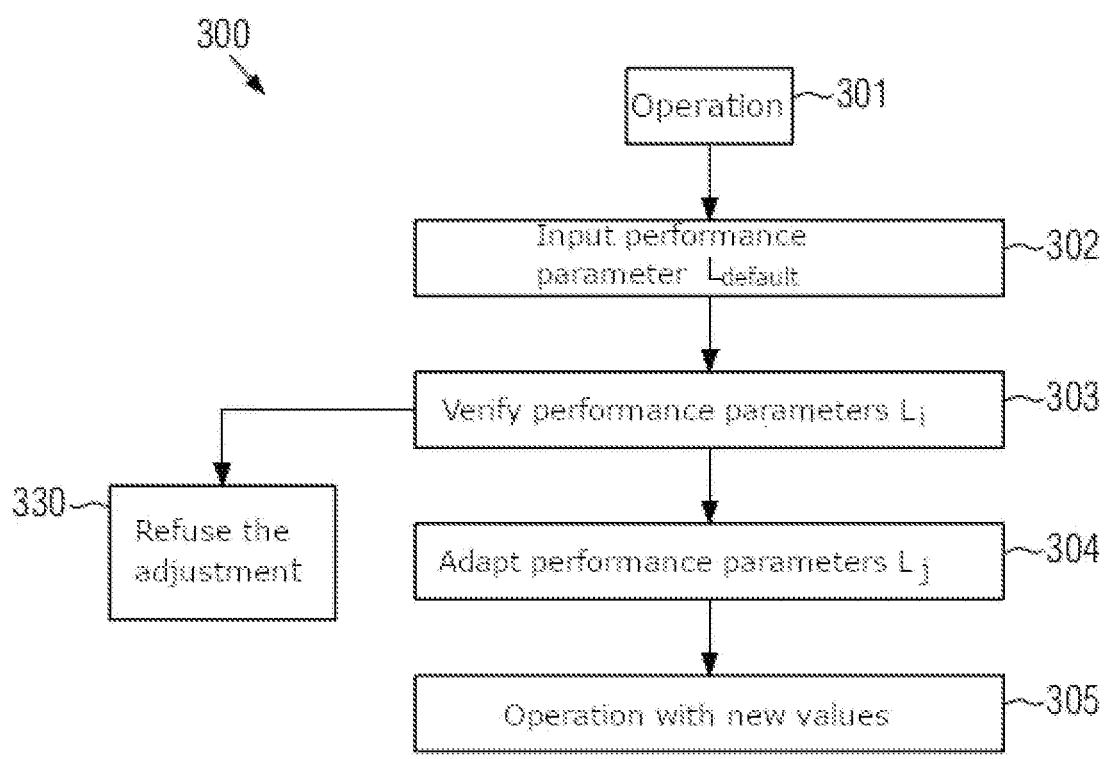
FIG. 3 shows a flow diagram according to a further embodiment.

FIG. 3 shows a possible embodiment in this regard.

In FIG. 3, the dough processing machine is first operated in step 301 according to the specifications set. A factor in the sense of FIG. 2 can be changed during operation, but does not need to be.

It can be provided that one of the workstations of dough processing machine 100 shown by way of example in FIG. 1 is configured as a "default station". This default station is characterized in that, due to the performance parameters that were changed thereon, the other performance parameters of the dough processing machine are likewise changed.

In step 302, the operator can now use the input device to perform an input with regard to a change in associated performance parameter $L_{default}$ of the default station. This can result in, for example, an increase or decrease of performance parameter $L_{default}$.

Since the workstation is a default station, it is now necessary to change the other performance parameters of all workstations (possibly except for the workstations whose performance parameters $\overline{L}$ must remain constant).

This is preferably done in such a way that all respective performance parameters in the direction of transport upstream and/or downstream of the default station are adjusted. However, the adjustment is performed in such a way that respective factors $$F_{nm} = \frac{L_n}{L_m}$$

are kept constant. This means, for example, that for a default station whose downstream workstation is linked to the default station by factor $F_{nm}=2$, doubling the performance parameter of the default station also requires doubling the performance parameter of the downstream workstation, because $$F_{default,m} = \frac{L_{default}}{L_m}.$$

It can now be verified in a next step 303 whether the necessary adjustment of performance parameters $L_i$ is permissible. This verification can be carried out analogously to the verification steps already described in FIG. 2, namely by verifying whether the performance parameter to be newly adjusted for the respective workstation is still in a performance parameter range permissible for this performance parameter.

The new value of the performance parameter is determined in a manner analogous to the description in FIG. 3, in that, starting from the default station and while retaining the corresponding factors, the new performance parameters are determined to match the new default of the performance parameter $L_{default}$. It is then verified for each of these performance parameters whether it is still within the performance parameter range permissible for the performance parameter.

If it is determined in step 303 that this is possible, then remaining performance parameters Li are adjusted in step 304 and the dough processing machine is operated with the new performance parameters in step 305, where all factors $F_{nm}$ are unchanged, i.e., the relative adjustment of the workstations to one another remains unchanged.

If, however, it is determined in step 303 that it is not possible to adjust at least one of the performance parameters based on new input $L_{default}$, then the adjustment can be refused in step 330, which is shown to the operator, for example, on display 160 of input device 150.

What is claimed is:

1. A dough processing machine for treating products in the food industry, the dough processing machine comprising:
   at least two workstations including first and second workstations arranged successively along a transport path of products in a direction of transport, wherein operation of the first workstation depends on a first performance parameter $L_1$, and operation of the second workstation depends on a second performance parameter $L_2$;
   a control unit connected to the workstations for adjusting the performance parameters; and
   an input device connected to the control unit via which a factor $$F = \frac{L_1}{L_2}$$

can be adjusted;
   wherein the control unit is configured to adjust the performance parameters of the first and second workstations as a function of F and to leave all other factors $$F_{nm} = \frac{L_n}{L_m}$$

unchanged, where $L_n$, $L_m$ are performance parameters of different workstations n, m.

2. The dough processing machine according to claim 1, wherein the control unit is configured to adjust at least one performance parameter of a workstation, that is arranged in the direction of transport upstream of the first workstation, as a function of F and $L_1$ once F has been adjusted; and/or
   the control unit is configured to adjust at least one performance parameter of a workstation, that is arranged in the direction of transport downstream of the second workstation, as a function of F and $L_2$ once F has been adjusted.

3. The dough processing machine according to claim 1, wherein the dough processing machine comprises a workstation, a performance parameter L of which is independent of the performance parameters of the other workstations, and wherein the control unit is configured to keep the performance parameter L constant once F has been adjusted.

4. The dough processing machine according to claim 1, wherein a workstation is further configured as a default station, and wherein the input device is configured to adjust a performance parameter $L_{default}$ and the control unit is configured to adjust all performance parameters of all workstations as a function of $L_{default}$.

5. The dough processing machine according to claim 4, where the performance parameters of all workstations can be adjusted by the control unit as a function of factors $$F_{nm} = \frac{L_n}{L_m}$$

and of $L_{default}$ in such a way that all $F_{nm}$ remain constant.

6. The dough processing machine according to claim 1, wherein the performance parameters are transport speeds.

7. The dough processing machine according to claim 1, wherein at least one of the workstations is or comprises a transport device for transporting products and/or at least one of the workstations is or comprises a treatment station for treating products.

8. The dough processing machine according to claim 1, wherein the control unit is configured to verify an adjustment of a factor based on a permissible performance parameter range and to carry out or refuse the adjustment of the factor in dependence of an outcome of the verification.

9. A dough processing machine for treating products in the food industry, the dough processing machine comprising:
   at least two workstations including first and second workstations arranged successively along a transport path of products in a direction of transport, wherein operation of the first workstation depends on a first performance parameter $L_1$ and operation of the second workstation depends on a second performance parameter $L_2$; and
   a controller connected to the workstations for adjusting the performance parameters, the controller having an input device via which a factor $$F = \frac{L_1}{L_2}$$

can be adjusted;
   wherein the controller is configured to adjust the performance parameters of the first and second workstations as a function of F and to leave all other factors $$F_{nm} = \frac{L_n}{L_m}$$

unchanged to change the operation of at least one of the workstations, where $L_n$, $L_m$ are performance parameters of different workstations n, m.

10. The dough processing machine according to claim 9, wherein the controller is configured to adjust at least one performance parameter of a workstation, that is arranged in the direction of transport upstream of the first workstation, as a function of F and $L_1$ once F has been adjusted; and/or
    the controller is configured to adjust at least one performance parameter of a workstation, that is arranged in the direction of transport downstream of the second workstation, as a function of F and $L_2$ once F has been adjusted.

11. The dough processing machine according to claim 9, wherein the dough processing machine comprises a workstation, a performance parameter L of which is independent of the performance parameters of the other workstations, and wherein the controller is configured to keep the performance parameter L constant once F has been adjusted.

12. The dough processing machine according to claim 9, wherein a workstation is further configured as a default station, and wherein the input device is configured to adjust a performance parameter $L_{default}$ and the controller is configured to adjust all performance parameters of all workstations as a function of $L_{default}$.

13. The dough processing machine according to claim 12, where the performance parameters of all workstations can be adjusted by the controller as a function of factors $$F_{nm} = \frac{L_n}{L_m}$$

and of $L_{default}$ in such a way that all $F_{nm}$ remain constant.

14. A method for controlling the operation of a dough processing machine for treating products in the food industry, the dough processing machine comprising at least two workstations including first and second workstations arranged consecutively along a transport path of products in a direction of transport, wherein operation of the first workstation depends on a first performance parameter $L_1$, and operation of the second workstation depends on a second performance parameter $L_2$, the dough processing machine further including a control unit connected to the workstations for adjusting the performance parameters, and an input device connected to the control unit, the method comprising:

adjusting a factor $$F = \frac{L_1}{L_2}$$

by way of the input device; and adjusting, by the control unit, the performance parameters of the first and second workstations as a function of the adjustment of F, wherein the control unit leaves all other factors $$F_{nm} = \frac{L_n}{L_m}$$

unchanged, where $L_n$, $L_m$ are performance parameters of different workstations n, m.

15. The method according to claim 14, wherein the control unit adjusts at least one performance parameter of a workstation that is arranged in the direction of transport upstream of the first workstation as a function of F and $L_1$ once F has been adjusted; and/or the control unit adjusts at least one performance parameter of a workstation that is arranged in the direction of transport downstream of the second workstation as a function of F and $L_2$ once F has been adjusted.

16. The method according to claim 14, wherein the dough processing machine comprises a workstation, a performance parameter L of which is independent of the performance parameters of the other workstations, and wherein the control unit is configured to keep the performance parameter L constant once F has been adjusted.

17. The method according to claim 14, wherein a workstation is configured as a default station, and wherein the input device is configured to receive an input for adjustment of a performance parameter $L_{default}$ and the control unit adjusts all performance parameters of all workstations as a function of $L_{default}$.

18. The method according to claim 17, wherein the performance parameters of all workstations are adjusted by the control unit as a function of factors $$F_{nm} = \frac{L_n}{L_m}$$

and $L_{default}$ in such a way that all factors $F_{nm}$ remain constant.

19. The method according to claim 14, wherein the performance parameters are transport speeds.

20. The method according to claim 14, wherein the control unit is configured to verify a setting of a factor based on a permissible performance parameter range and to carry out or refuse adjustment of the factor in dependence of an outcome of the verification.

* * * * *